(12) United States Patent
Hamaguchi

(10) Patent No.: US 6,898,798 B2
(45) Date of Patent: May 24, 2005

(54) DISK CARTRIDGE HAVING ANTI-STATIC LAYER AND DISK APPARATUS FOR DRIVING THE SAME

(75) Inventor: Shingo Hamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 09/965,613

(22) Filed: Sep. 27, 2001

(65) Prior Publication Data

US 2002/0171964 A1 Nov. 21, 2002

(30) Foreign Application Priority Data

May 15, 2001 (JP) ........................................ 2001-144558

(51) Int. Cl.$^7$ ............................................. G11B 23/03
(52) U.S. Cl. ..................................... 720/737; 360/133
(58) Field of Search .......................... 360/99.02, 99.03, 360/99.07, 97.01, 133, 99.06, 69; 369/291; 720/737

(56) References Cited

U.S. PATENT DOCUMENTS 4,928,194 A * 5/1990 Elly et al. ................ 360/97.04
5,475,548 A * 12/1995 Rudi et al. .................. 360/96.5
6,574,078 B1 * 6/2003 Voldman ..................... 360/323
6,594,110 B2 * 7/2003 Kimura et al. ........... 360/99.08

FOREIGN PATENT DOCUMENTS

| JP | 03-178087 | | 8/1991 | |
|----|-----------|---|--------|---|
| JP | 04-134774 | | 5/1992 | |
| JP | 04-134776 | | 5/1992 | |
| JP | 6-48590 | | 6/1994 | |
| JP | 06-048590 | * | 6/1994 | ......... G11B/23/003 |
| JP | 07-153171 | | 6/1995 | |
| JP | 08-297943 | | 11/1996 | |

* cited by examiner

*Primary Examiner*—Sinh Tran
*Assistant Examiner*—Daniell L. Negrón
(74) *Attorney, Agent, or Firm*—Greer, Burns & Crain, Ltd.

(57) ABSTRACT

A disk cartridge includes a data storage disk and a casing for accommodating the disk. The disk includes a recoding portion and a non-recording portion. The casing has an inner surface facing the disk. An anti-static layer is provided on the inner surface of the casing for eliminating the static electricity generated on the disk. An elastic member or cushion is provided on the inner surface of the casing. The recording portion of the disk is brought into contact with the anti-static layer only when the disk is not rotating.

15 Claims, 13 Drawing Sheets

DISK CARTRIDGE HAVING ANTI-STATIC LAYER AND DISK APPARATUS FOR DRIVING THE SAME

BACKGROUND OF THE INVENTION

1. Field of the Invention

The present invention relates to a disk cartridge to accommodate a storage disk such as an optical disk, magnetic disk or magneto-optical disk. The present invention also relates to a disk apparatus for writing data to or reading data from a storage disk.

2. Description of the Related Art

Conventionally, several kinds of storage disks, such as optical disks, magnetic disks or magneto-optical disks, have been used for storing a large amount of data. For protective purposes, a storage disk may be accommodated in a plastic cartridge. This cartridge, with the storage disk incorporated, is inserted into a disk apparatus for reading or writing data.

As is known in the art, a storage disk may be unduly charged within the plastic cartridge. The static electricity will attract dust or other small objects floating in the air. As a result, accumulations of these particles may be built up on the storage disk, which is disadvantageous to conducting proper data reading or data writing by a laser beam.

As a way to address the above problem, JP-A-7(1995)-153171 discloses a discharge brush disposed inside of the disk cartridge. This brush is brought into contact with the storage disk when the disk cartridge is inserted into the disk apparatus. Another example is disclosed in JP-A-4(1992)-134776, which teaches that a movable conductive cloth or other material is arranged between the disk cartridge and the disk apparatus for eliminating charged electricity.

While the above conventional techniques are functional, they also suffer the following drawbacks.

Specifically, the conventional discharge brush mentioned above is held in contact with the storage disk while this disk is being rotated. Likewise, the conductive cloth as the second example is brought into pressing contact with the storage disk when the rotating disk is about to be stopped. As a result, in both cases, the disk surface may be scratched or even damaged to an unacceptable extent.

Such scratches or damages in the disk surface are undesirable since they may perturb the data-reading or data-writing laser beam irradiated onto the storage disk, thereby impeding the proper data handling operations. The adverse effect will become more conspicuous when the laser beam is made smaller in diameter and therefore more susceptible to such imperfections on the disk.

SUMMARY OF THE INVENTION

The present invention has been proposed under the circumstances described above. It is, therefore, an object of the present invention to provide a disk cartridge designed to prevent the build-up of static electricity or reduce its effects without damaging the data-storing region of the storage disk. Another object of the present invention is to provide a disk apparatus suitable for utilizing such a disk cartridge.

According to a first aspect of the present invention, there is provided a disk cartridge which includes: a data storage disk having a recoding portion and a non-recording portion; a casing having an inner space for accommodating the disk, the casing including an inner surface facing the disk; an anti-static layer provided on the inner surface of the casing for eliminating static electricity generated on the disk; and an elastic member provided on the inner surface of the casing.

Preferably, the casing is formed with an opening communicating with the inner space. The anti-static layer is formed in a disk-facing region on the inner surface and avoids the opening. The elastic member is brought into contact with the non-recording portion.

Preferably, the disk cartridge of the present invention further includes a shutter and a hub, where the shutter is slidable on the casing between a close position and an open position for selectively closing the opening of the casing, and the hub is attached to the center of the disk. The hub comes into contact with the shutter in the close position so that the disk is spaced from the anti-static layer.

Preferably, the hub is provided with a magnetic member.

Preferably, the disk cartridge of the present invention further includes a conductive member provided on an external surface of the casing, where the conductive member is connected to the anti-static layer.

According to a second aspect of the present invention, there is provided a disk apparatus for managing data with respect to a disk cartridge, where the cartridge includes a data storage disk, a hub attached to the disk, a casing for accommodating the disk, an anti-static layer for eliminating static electricity generated on the disk, and an elastic member provided on the casing. The disk apparatus includes: a disk drive into which the disk cartridge is inserted; a rotatable holder that is detachably fixed to the hub of the disk and rotates the disk; an actuator that causes the holder and the casing to approach and recede from each other; and a controller that manages the holder and the actuator. The controller causes the actuator to move the holder to a discharge position where the disk is held in contact with the anti-static layer.

Preferably, the controller causes the actuator to move the holder to a rotatable position where the disk and the anti-static layer are spaced enough to allow the disk to rotate freely.

Preferably, the controller causes the actuator to move the holder to an eject position where the disk cartridge is ejectable from the disk drive.

Preferably, the disk drive is provided with a ground terminal held at a ground potential. The ground terminal comes into contact with a conductive member provided on the disk cartridge when the cartridge is inserted into the disk drive.

Preferably, the controller causes the holder to rotate through an angle so that all recording area of the disk is discharged.

Preferably, the elastic member is brought into contact with the disk when the disk is rotating at a rate lower than a predetermined threshold.

Preferably, the disk apparatus of the present invention further includes a discharge on/off switch for selectively causing the disk to contact with the anti-static layer.

Preferably, the controller causes the actuator to move the holder for bringing the disk into contact with the anti-static layer when the disk is inserted into the disk drive.

Preferably, the controller causes the actuator to move the holder for bringing the disk into contact with the anti-static layer when the disk is about to be ejected from the disk drive.

Preferably, the holder is disposed opposite to the anti-static layer with respect to the disk.

Other features and advantages of the present invention will become apparent from the detailed description given below with reference to the accompanying drawings.

DETAILED DESCRIPTION OF THE PREFERRED EMBODIMENT

The preferred embodiments of the present invention will be described below with reference to the accompanying drawings.

Figure 1:
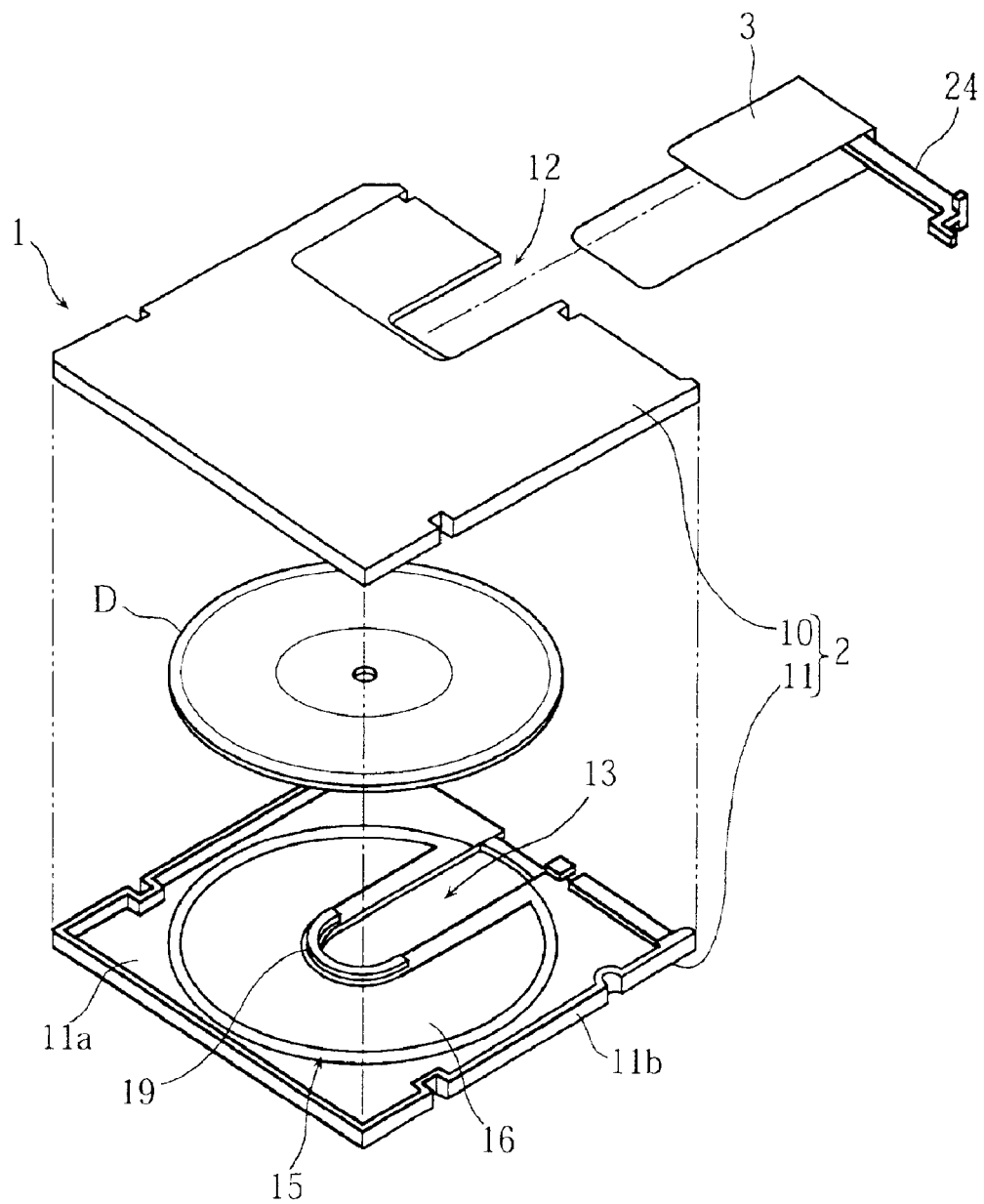
FIG. 1 is an exploded view showing a disk cartridge embodying the present invention.

FIG. 1 shows the principal components of a disk cartridge (generally indicated by reference numeral 1) embodying the present invention. The disk cartridge 1 includes a casing 2 and a shutter 3. The casing 2 has an inner empty space to accommodate a storage disk D. The shutter 3 is supported by the casing 2 in a slidable manner.

Figure 2A:
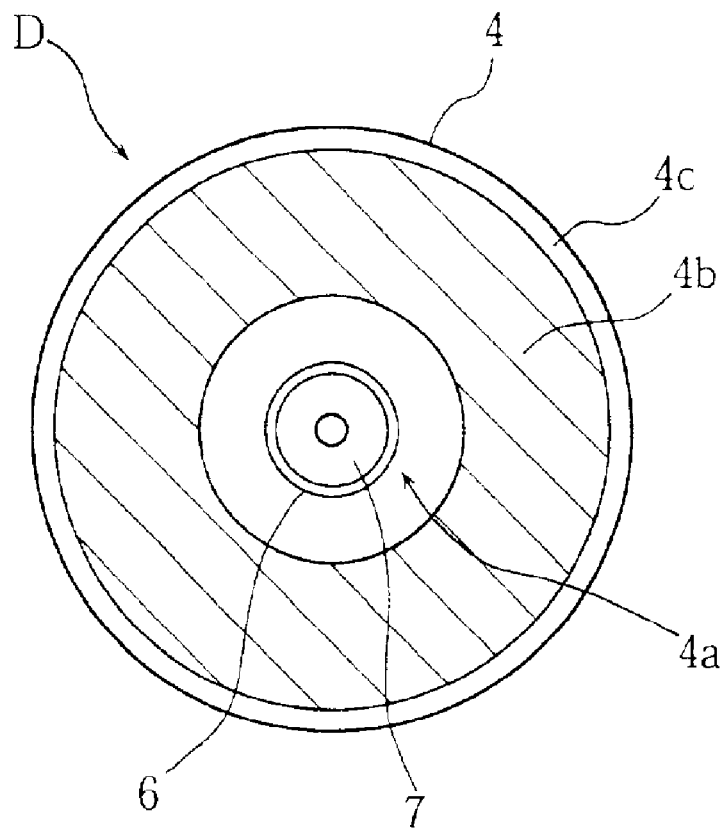
FIG. 2A is a bottom view showing the storage disk used for the disk cartridge of FIG. 1.
Figure 2B:
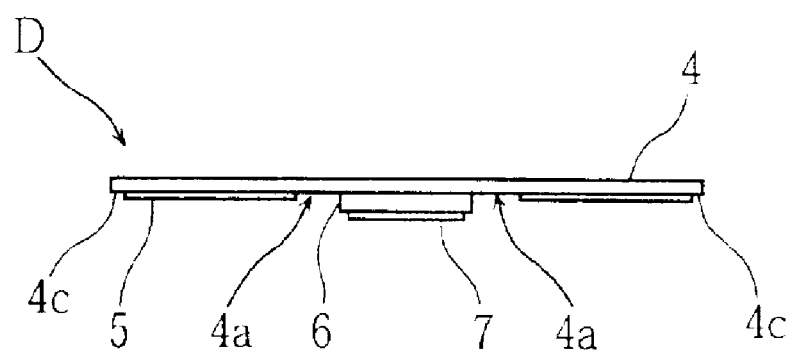
FIG. 2B is a side view showing the same storage disk.

The storage disk D may be an optical disk, magnetic disk or magneto-optical disk for example. Referring to FIGS. 2A–2B, the storage disk D includes a circular base plate 4, a recording layer 5 disposed on the base plate 4, and a protection coating (not shown) to cover the recoding layer 5. The base plate 4 is made of resin such as polycarbonate or polymethyl methacrylate. The base plate 4 has a thickness of about 0.6 mm~1.2 mm. The lower side of the storage disk D (see FIG. 2A) is divided into three portions: a circular central portion 4a, an intermediate torus portion 4b (shaded in the figure), and the remaining peripheral portion 4c. A short cylindrical hub 6 is attached to the central portion 4a. As shown in FIG. 2B, the hub 6 projects downward, and has a flat lower end to which a magnetic member 7 is attached. The recording layer 5 is provided in the torus portion 4b.

Referring back to FIG. 1, the casing 2 consists of an upper case member 10 and a lower case member 11 both of which are made of plastic. The upper case member 10 is formed with a first opening 12, while the lower case member 11 with a second opening 13. The first and the second openings 12, 13 have a generally rectangular configuration elongated in the radial direction of the disk D. As seen from FIG. 1, the second opening 13 is longer than the first opening 12. Specifically, the first opening 12 is short of the center of the upper case member 10 (that corresponds in position to the center of the disk D), whereas the second opening 13 reaches the center of the lower case member 11 (that also corresponds in position to the center of the disk D). The second opening 13 allows the passage of the laser beam to irradiate the recording region of the disk D, while also allowing the insertion of a spindle motor (to be described later) to rotate the disk D.

Figure 3A:
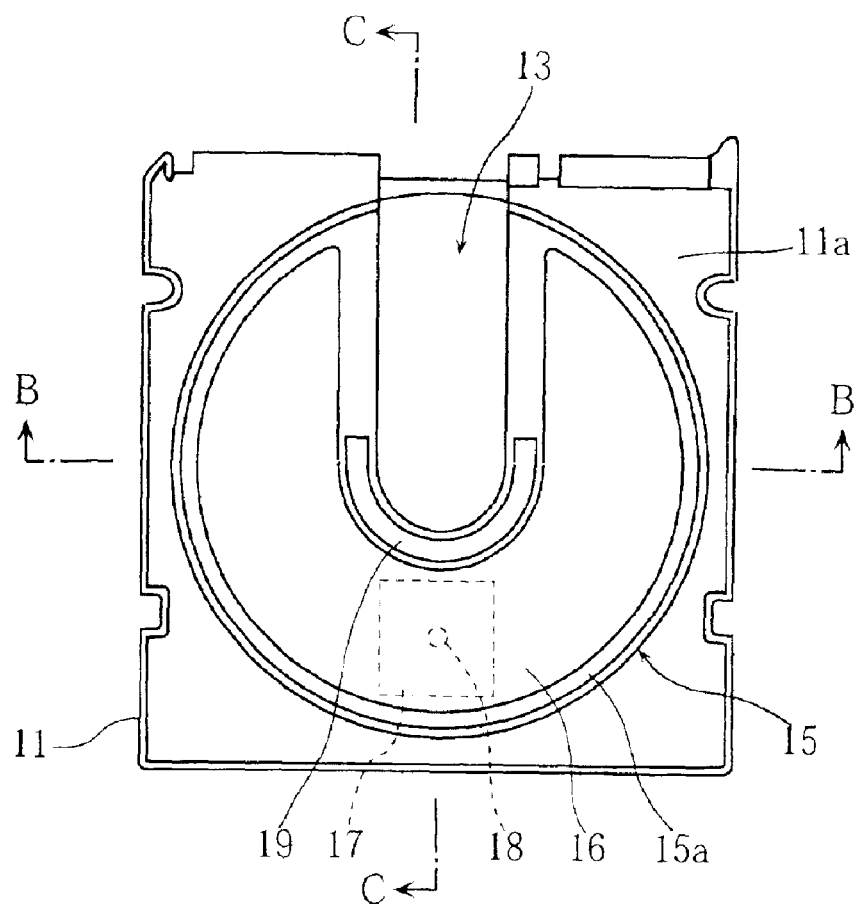
FIG. 3A is a plan view showing the lower case member of the disk cartridge.
Figure 3B:
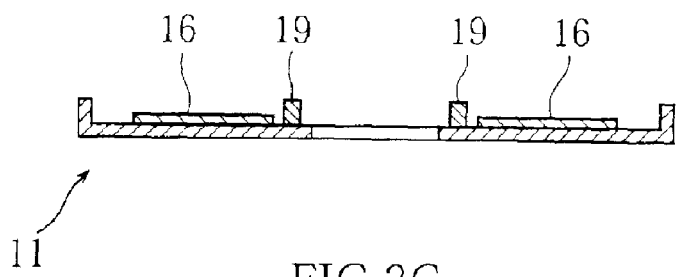
FIG. 3B is a sectional view taken along lines B—B in FIG. 3A.

Referring now to FIG. 3A, the lower case member 11 is provided, on its inner side 11a, with a circular, disk-facing portion 15 that is generally equal in size to the storage disk D. The disk-facing portion 15 is provided with an anti-static layer 16 for eliminating the static charge generated on the disk D (see also FIGS. 3B and 3c). As shown in FIG. 3A, the anti-static layer 16 has a generally U-shaped configuration to cover the most of the disk-facing portion 15, avoiding the second opening 13. The anti-static layer 16 may be made by solidifying conductive paint applied to the disk-facing portion 15.

With the above layout, the storage disk D within the casing 2 has its recording layer 5 held in facing relation to the anti-static layer 16. The generally U-shaped anti-static layer 16 covers a wide area of the recording layer 5 of the disk D, thereby making it possible to conduct efficient-elimination of the static electricity generated on the disk D.

Figure 3C:
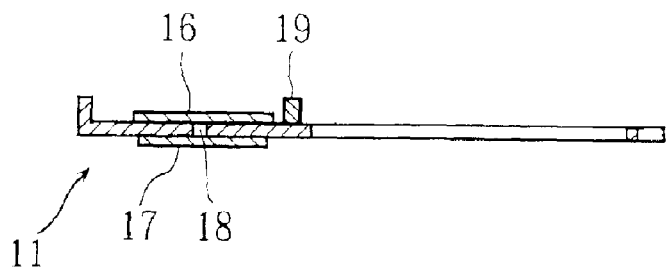
FIG. 3C is a sectional view taken along lines C—C in FIG. 3A.
Figure 4:
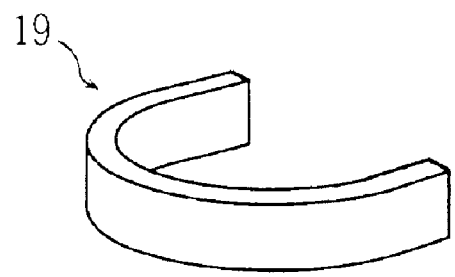
FIG. 4 is a perspective view showing a cushion used for the disk cartridge.

As shown in FIG. 3C, the anti-static layer 16 is connected to a metal sheet 17 provided on the outer surface of the lower case member 11 of the casing 2. For establishing this electrical connection, the lower case member 11 is formed with a through-hole 18 whose inner surface is coated with a conductive layer (not shown) contacting with the anti-static layer 16 and the metal sheet 17. When the disk D is inserted into the disk apparatus, the metal sheet 17 comes into contact with a ground terminal (to be described later) provided on the disk apparatus.

Referring to FIGS. 1, 3A~3C and 4, a generally U-shaped cushion 19 is attached to the inner surface 11a of the lower case member 11 along an inner end part of the contour of the second opening 13. The cushion 19 is made of an elastic material including rubber, sponge, etc. In the illustrated embodiment, the cushion 19 is greater in height than the hub 6 (see FIG. 2B) of the disk D. As shown in FIG. 3A, the cushion 19 is disposed in the space between the second opening 13 and the anti-static layer 16. Thus, in the assembled state of the disk cartridge 1, the cushion 19 is prevented from facing the recording layer 5 of the storage disk D. To this end, the cushion 19 may be disposed in the peripheral region 15a (see FIG. 3A) of the disk-facing portion 15.

Figure 5:
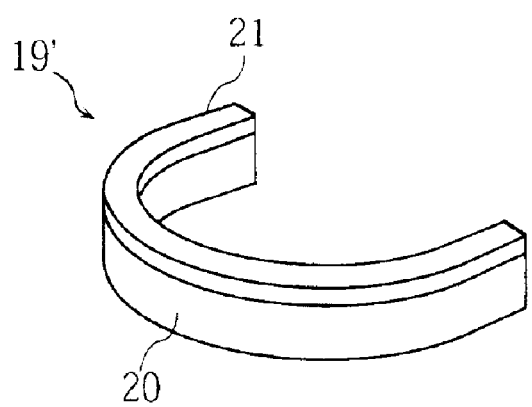
FIGS. 5 and 6 show examples of modified cushions.
Figure 6:
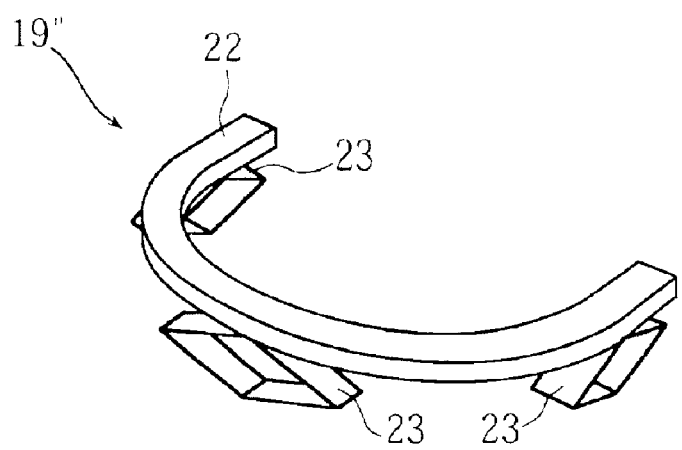

FIGS. 5 and 6 show modified examples of the cushion 19. The cushion 19' shown in FIG. 5 includes a resilient U-shaped base 20 and a soft top 21 crowning the base 20. The top 21, made of rubber for example, is more elastic than the base 20, so as not to damage the storage disk D upon contacting. On the other hand, the cushion 19" shown in FIG. 6 includes a resilient U-shaped member 22 and a plurality of springs 23 supporting the U-shaped member 22.

Referring back to FIG. 1, the shutter 3 is slidable on the casing 2 for selectively closing and exposing the first and the second openings 12, 13. The shutter 3 is provided with an actuation arm 24. In the normal state, a spring (not shown) urges the shutter 3 in a direction to close the first and the second openings 12, 13. As the disk cartridge 1 is inserted into the disk apparatus, a non-illustrated shutter actuation mechanism moves the arm 24 (and hence the shutter 3) relative to the casing 2, thereby exposing the openings 12 and 13. As a result, a part of the recording layer 5 of the disk D and the hub 6 are exposed through the second opening 13.

Figure 7:
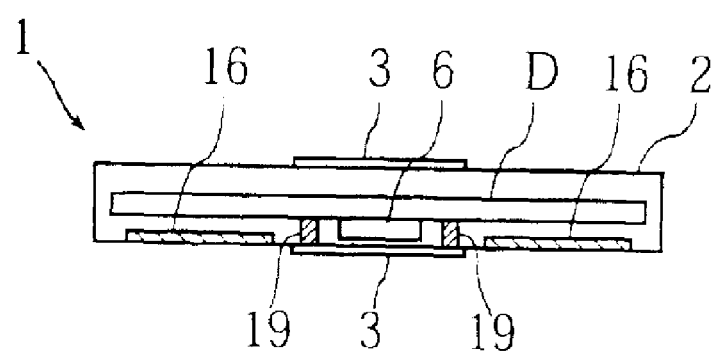
FIG. 7 shows, in section, the disk cartridge held in the natural state.
Figure 8:
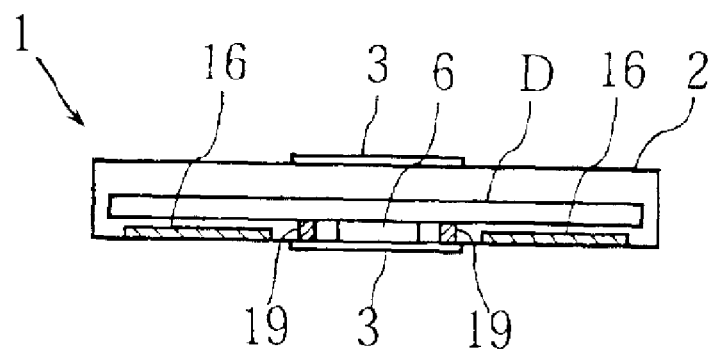
FIG. 8 shows, in section, the disk cartridge held in a vibrant state.

FIG. 7 shows, in section, the disk cartridge 1 when it is held in a stable (non-vibrant) condition, while FIG. 8 shows the same cartridge put in an unstable (vibrant) condition. In the stable condition (FIG. 7), the disk D is sufficiently spaced from the anti-static layer 16 since the cushion 19 is greater in height than the hub 6, as noted above. This is advantageous to protecting the recording layer 5 (FIG. 2B) from damage. In the unstable condition (FIG. 8), the storage disk D may be displaced downward in a jolt. Even in this case, the recording layer 5 does not bump into the anti-static layer 16, since the hub 6, abutting on the shutter 3, is long enough to prevent the collision. In this connection, it should be noted that the resilient cushion 19 is provided near the hub 6. While being compressed under the pressure of the storage disk D, the cushion 19 prevents the disk D from tilting. In this manner, the storage disk D is more reliably protected from possible damage.

Figure 9:
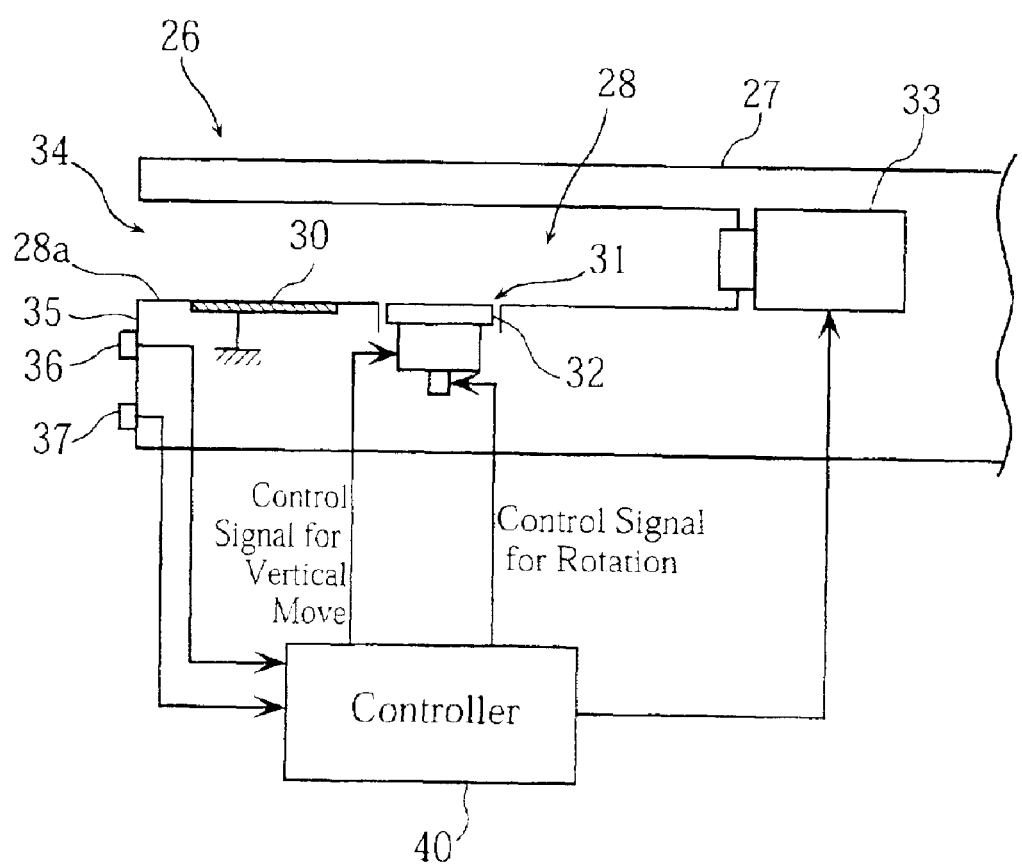
FIG. 9 shows the basic components of a disk apparatus embodying the present invention.

Reference is now made to FIG. 9 illustrating the basic components of the disk apparatus (generally indicated by reference numeral 26) into which the disk cartridge 1 is inserted to write or read data.

Specifically, the disk apparatus 26 includes a main body 27 which is provided with a disk drive 28 into which the disk cartridge 28 is inserted. The lower wall surface 28a of the disk drive 28 is provided with a ground terminal 30 held at the ground potential. The ground terminal 30 comes into contact with the metal sheet 17 of the lower case member 11 (see FIG. 3C) when the disk cartridge 1 is inserted into the disk drive 28.

The lower wall surface 28a is also formed with an opening 31 for exposing a spindle motor 32. Though not shown in FIG. 9, the spindle motor 32 is provided, at its top, with a magnet to hold the hub 6 of the disk D. Attached to the motor 32, the hub 6 and hence the disk D are rotated by the motor. The motor 32 can be moved vertically (i.e. toward or away from the inserted disk cartridge) by a non-illustrated actuator or cam mechanism.

The disk drive 28 is provided, at its deepest portion, with a holding/releasing mechanism 33 for holding the inserted cartridge 1 in place and ejecting the cartridge 1 from the disk drive 28. To initiate the releasing of the inserted cartridge 1, an eject switch 36 is provided on a front panel 35, together with a discharge on/off switch 37 (to be described later).

The disk apparatus 26 includes a control unit 40 serving as a microcomputer. To this end, the control unit 40 includes a CPU (central processing unit), a ROM (read-only memory), etc. The ROM may store programs necessary to operate the control unit 40. As shown in FIG. 9, the controlling unit 40 is connected to the spindle motor 32, the non-illustrated vertical actuator for the motor 32, the hold/release mechanism 33, the eject switch 36, and the discharge on/off switch 37.

Reference is now made to FIGS. 10~18, to illustrate a process of eliminating undesired static electricity from the disk cartridge 1 of the present invention. As will be seen from the following description, the static electricity elimination according to the present invention may be carried out at two different stages.

Figure 10:
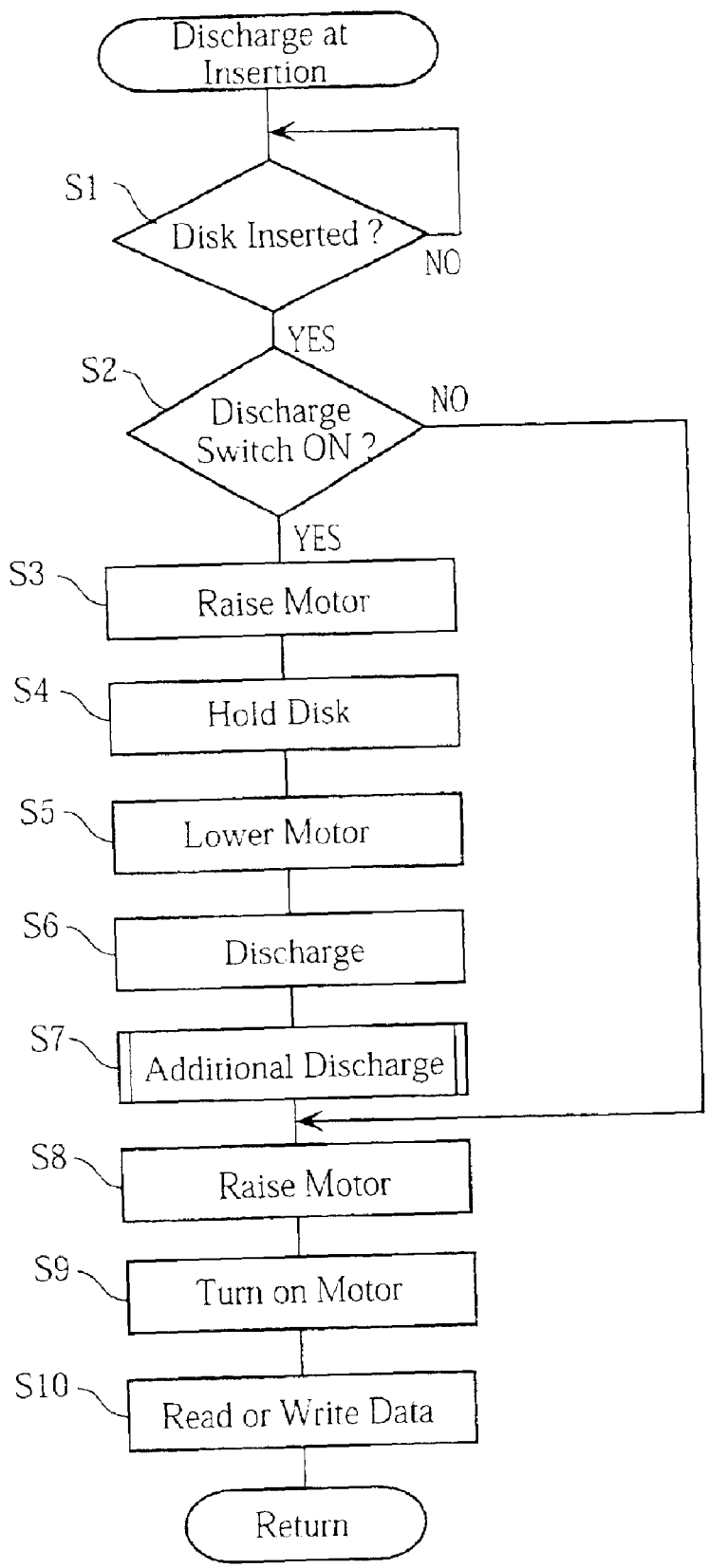
FIGS. 10~12 are flow charts illustrating the operations of the controller incorporated in the disk apparatus.
Figure 13:
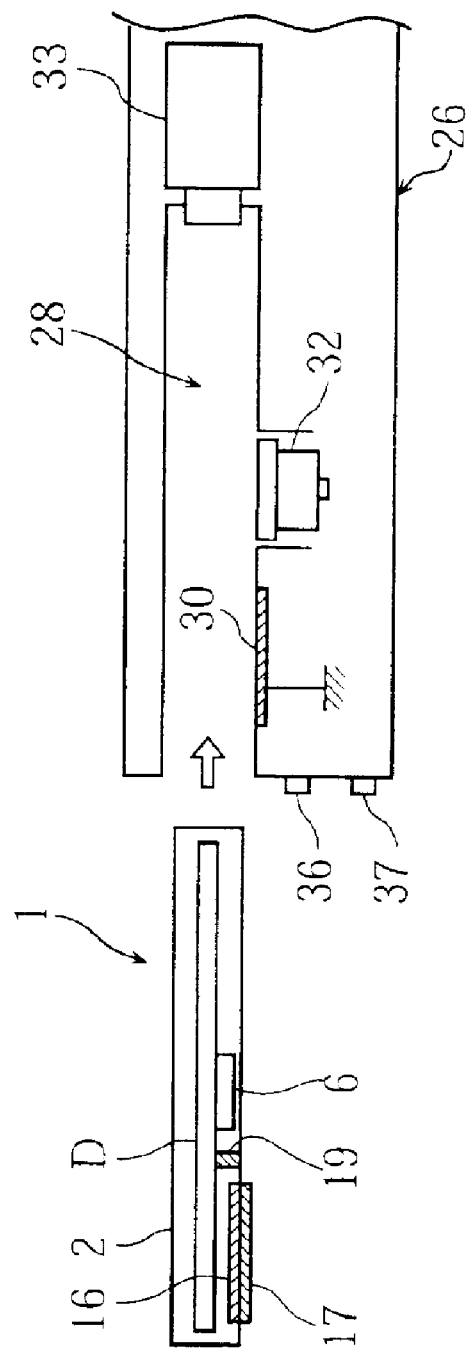
FIG. 13 illustrates how the disk cartridge is inserted into the disk apparatus.
Figure 14:
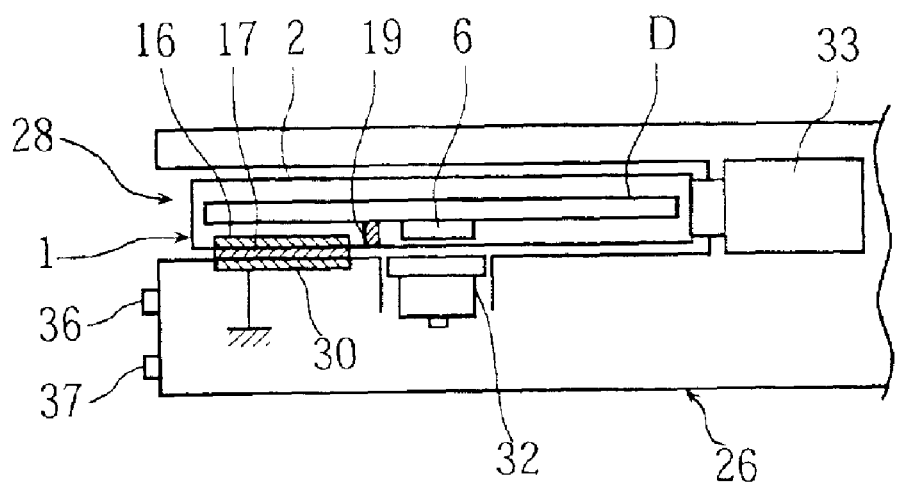
FIGS. 14~17 illustrate the cartridge-loaded conditions in the disk drive.
Figure 15:
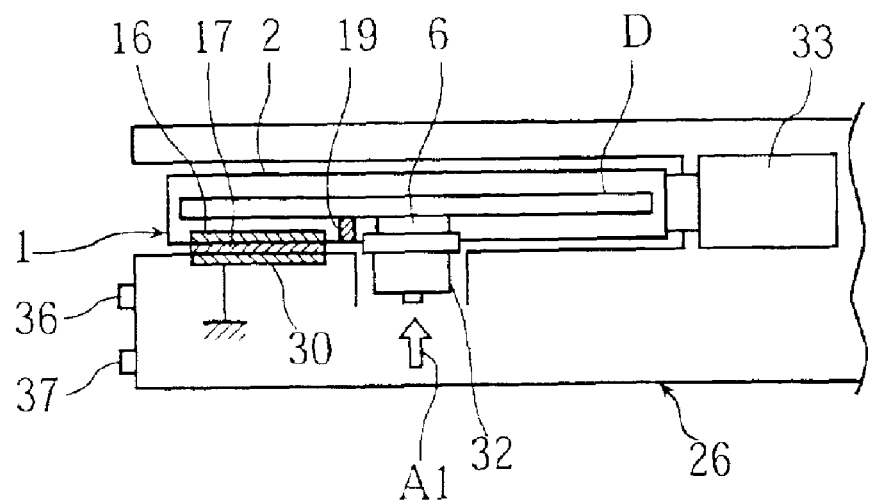

Referring to FIG. 10, the first elimination of the static electricity is performed in the following manner. First, at Step 1 (S1), the control unit 40 determines weather or not the disk cartridge 1 has been inserted into the disk apparatus 26. To this end, a detection sensor (not shown) for the disk cartridge is provided on hold/release mechanism 33. FIG. 13 shows a state in which the disk cartridge 1 has not been inserted into the disk apparatus 26 yet, while FIG. 14 shows a state in which the disk 1 cartridge has been loaded into the disk drive 28 of the disk apparatus 26.

When the non-illustrated detection sensor detects the loading of the disk cartridge 1 into the disk drive 28, a detection signal is outputted to the control unit 40.

As the disk cartridge 1 is inserted into the disk drive 28, the shutter 3 (see FIG. 1) is opened, thereby exposing parts of the storage disk D and the hub 6 through the first opening 12 or second opening 13. At the same time, the metal sheet 17 of the cartridge 1 comes into contact with the ground terminal 30 of the disk apparatus 26. As a result, the anti-static layer 16 on the cartridge 1 is grounded via the metal sheet 17.

Based on the detection signal supplied from the non-illustrated detection sensor, the control unit 40 recognizes that the disk cartridge 1 has been inserted into the disk drive 28 (S1: YES). Then, the control unit 40 determines whether or not the discharge on/off switch 37 has been turned on (meaning that the user wants the storage disk D to be discharged) within a predetermined period of time (S2). When the user wants no discharging operation, the switch 37 is turned off. Such may be the time when the user speculates that no or only little static electricity is generated on the disk D, for the disk cartridge 1 has been preserved in a quiet place. The switch 37 may also be turned off when the user is impatient to start the data-processing operation immediately.

When the switch 37 is turned on with a right timing, (S2: YES), the control unit 40 sends an instruction to the non-illustrated vertical actuator to raise the spindle motor 32 (S3), as indicated by arrow A1 in FIG. 15. Since the top of the spindle motor 32 is provided with a magnet, the magnetic member 7 (see FIG. 2B) on the hub 6 is attached to the top of the spindle motor 32 (S4). Thus, the storage disk D is magnetically retained on the motor 32.

Then, the control unit 40 sends an instruction to the non-illustrated vertical actuator to lower the motor 32 (S5). Accordingly, the motor 32 is moved downward, as indicated by arrow A2 in FIG. 16, until the storage disk D reaches the predetermined discharge position. At this stage, the cushion 19 is compressed between the disk D and the lower case member 12, while the disk D (precisely, the recoding layer 5 of the disk) contacts with the anti-static layer 16 of the cartridge 1. Since the layer 16 is grounded via the metal sheet 17 and the ground terminal 30, as noted above, the storage disk D contacting with the layer 16 is properly discharged (S6).

In the above process, the discharging of the disk D is performed while the disk D is in a non-rotating state. Thus, there is no need to worry about the damaging of the recording layer 5 through the contact with the anti-static layer 16.

In the illustrated embodiment, the anti-static layer 16 is U-shaped (see FIG. 3A), thereby failing to contact with the entire surface of the torus recording layer 5 at one time. Thus, there may be a non-discharged portion left in the recording layer 5 after the first discharging operation has been done. In such an instance, preferably, an additional or supplemental discharging operation (S7) will be performed for the non-discharged portion in the following manner.

Figure 11:
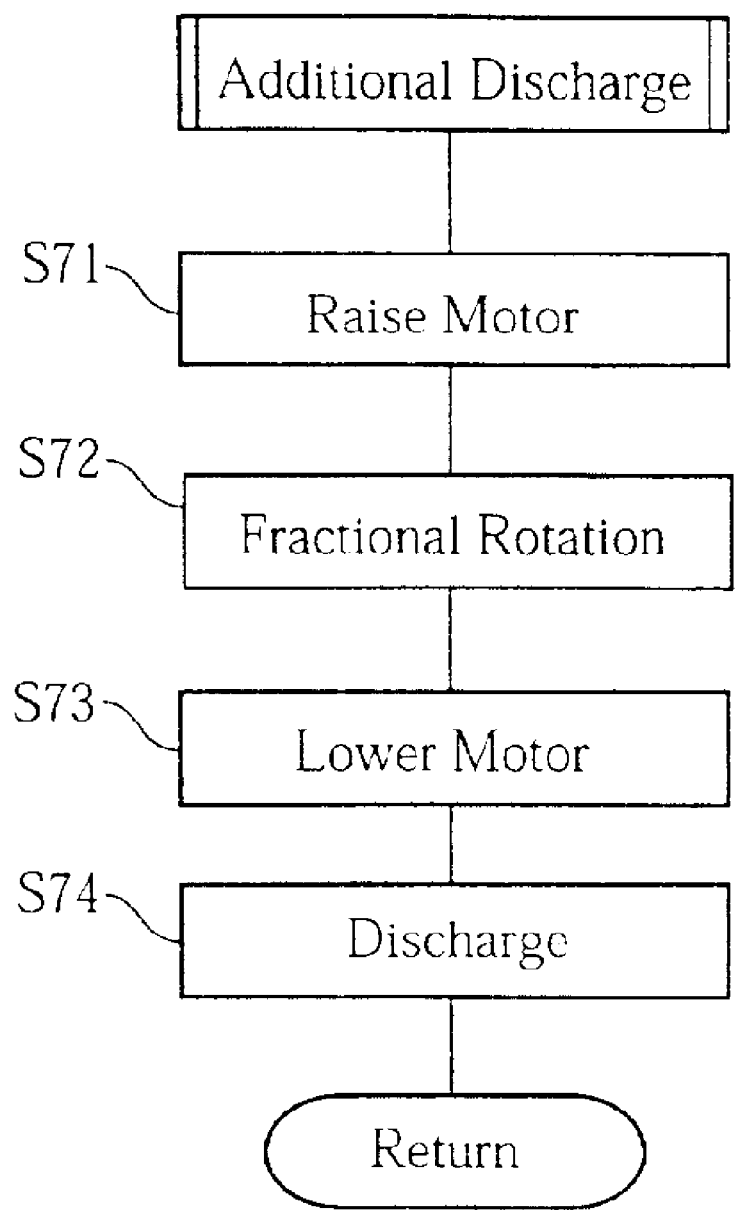
Figure 16:
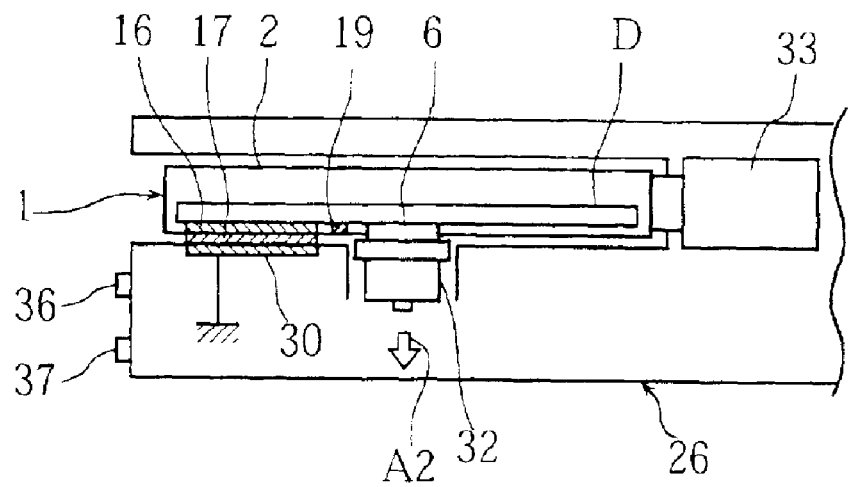
Figure 17:
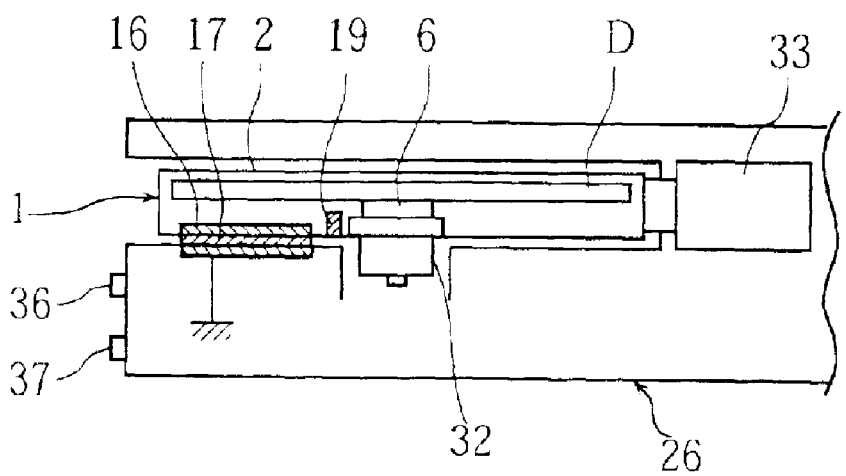

Referring to FIG. 11, in the additional or second discharging operation, first, the control unit 40 raises the spindle motor 32 (S71) to separate the storage disk D from the anti-static layer 16, as shown in FIG. 17. At this stage, the disk D is free to rotate. Then, the disk D is rotated through a suitable angle (S72) so that the non-discharged portion of the disk D comes above the anti-static layer 16. Then, the spindle motor 32 is lowered to the discharging position shown in FIG. 16 for the second discharging operation (S73). Thus, the storage disk D is held in contact with the anti-static layer 16, whereby the non-discharged portion of the disk D is discharged (S74). As readily understood, if the disk D still has a non-discharged portion after the second discharging operation, a third (maybe more) discharging operation will be performed.

After all of the charged areas on the disk D have been properly discharged, the control unit 40 raises the spindle motor 32 (S8 in FIG. 10) to separate the disk D from the anti-static layer 16, so that the storage disk D is brought to the rotatable position shown in FIG. 17. As a result, the compressed cushion 19 is detached from the disk D, to be restored to the original shape.

Then, the control unit 40 sends an instruction to the spindle motor 32 to rotate (S9). Accordingly, the disk D is brought into rotation during which a laser beam from the optical head (not shown) irradiates the recording layer of the disk D for reading or writing data (S10).

According to the present invention, the storage disk D being rotated is appropriately spaced from the anti-static layer 16 and from the cushion 19. Thus, the recording layer 5 of the disk D will not be damaged by the anti-static layer 16 nor the cushion 19. Further, even if the cushion 19 comes into contact with the disk D, the possible contact point is not on the recording layer 5, but on the other portions on the disk D.

Thus, the data-reading or data-writing operation is properly performed with respect to the storage disk D. Another advantage is that the static electricity generated on the disk D can be discharged immediately after the cartridge 1 is inserted into the disk apparatus 26. With such a precaution, it is possible to perform more reliable data-processing operations with respect to the disk D.

Turning back to Step 2 in FIG. 10, when the discharge on/off switch 37 is turned off (S2: NO), no discharging operation is performed after the insertion of the disk cartridge 1. In this case, the control unit 40 raises the storage disk D to the rotatable position together with the spindle motor 32 (S8), and then rotates the motor 32 (S9) for data-processing (S10).

Figure 12:
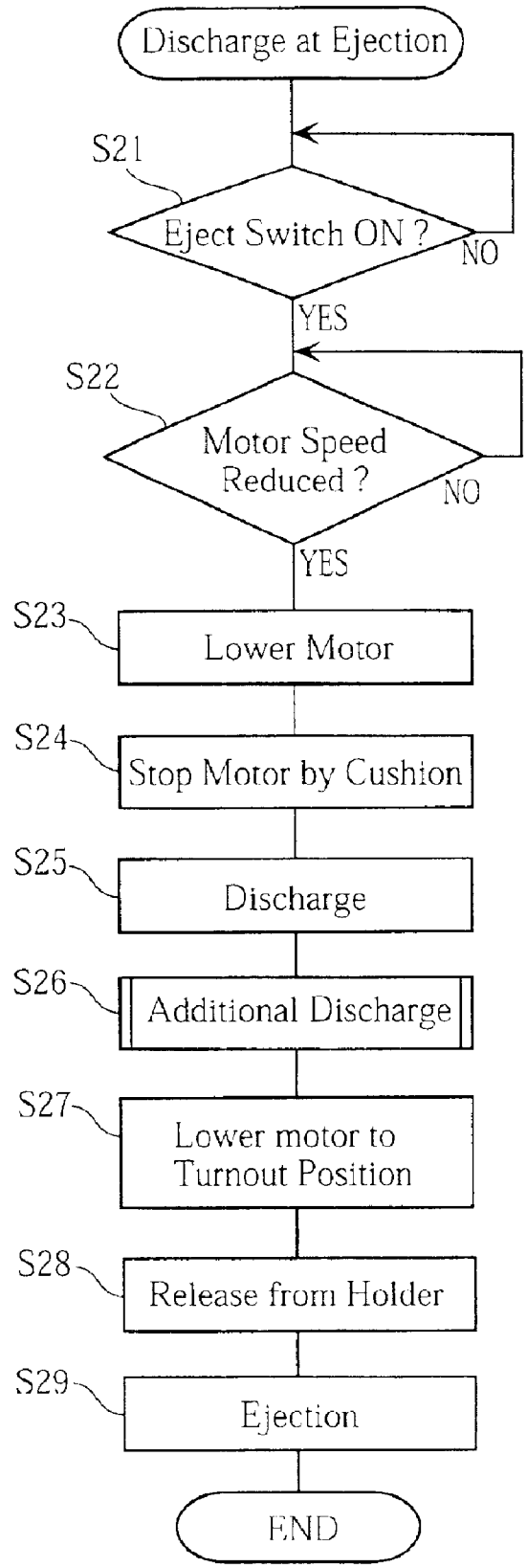

Reference is now made to FIG. 12 to illustrate the process of ejecting the disk cartridge 1 from the disk apparatus 26. First, at Step 21, the control unit 40 determines whether or not the eject switch 36 has been turned on after the data-reading or -writing operation is over. When the eject switch 36 is turned on (S21: YES), the control unit 40 will terminate the rotation of the spindle motor 32. At this time, the control unit 40 monitors the rotation speed (turns per second) of the storage disk D based on detection signals supplied from a rev counter (not shown). Through this, the control unit 40 determines whether or not the rotation speed of the disk D is below a predetermined threshold (S22). When the rotation speed is found to be equal to or below the threshold (S22: YES), the spindle motor 32 is lowered (S23). In other words, the motor 32 is lowered while the disk D is still in rotation. As a result, the storage disk D is brought into contact with the cushion 19, thereby coming to a halt by friction (S24).

Thereafter, the control unit 40 lowers the spindle motor 32 and the disk D to the discharging position shown in FIG. 16.

At this stage, the recording layer (not shown in FIG. 16) of the disk D contacts the anti-static layer 16, so that it can be discharged (S25). In this case again, an additional discharging operation may be performed (S26) if there is a non-discharged portion left on the disk D.

Then, the control unit 40 lowers the spindle motor 32 further to a turnout position (S27), so that the motor 32 is detached from the hub 6 (see FIG. 14). As a result, the storage disk D is moved away from the anti-static layer 16 by the restoring force of the cushion 19.

Figure 18:
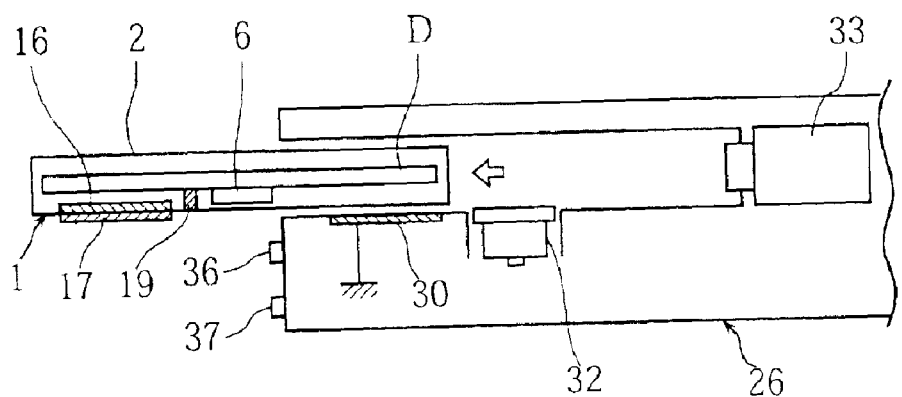
FIG. 18 illustrates how the disk cartridge is ejected from the disk drive.

Then, the control unit 40 sends an instruction to the hold/release mechanism 33 to eject the disk cartridge 1. Upon receiving this instruction, the mechanism 33 stops holding the casing 2 of the cartridge (S28). As a result, the cartridge 1 is ejected from the disk apparatus 26 (S29), as shown in FIG. 18.

In the above-described embodiment, the storage disk D is discharged before the ejection of the disk cartridge 1. Such terminal discharging is advantageous since the user may be able to use this disk cartridge again without subjecting it to the initial discharging process which should otherwise be performed before starting a new data-reading or data-writing operation with the disk cartridge. Another advantage resides in that the terminal discharging is performed in the course of the ejection of the disk cartridge 1. In this manner, the entire disk cartridge-handling procedure can be shortened in time.

Figure 19:
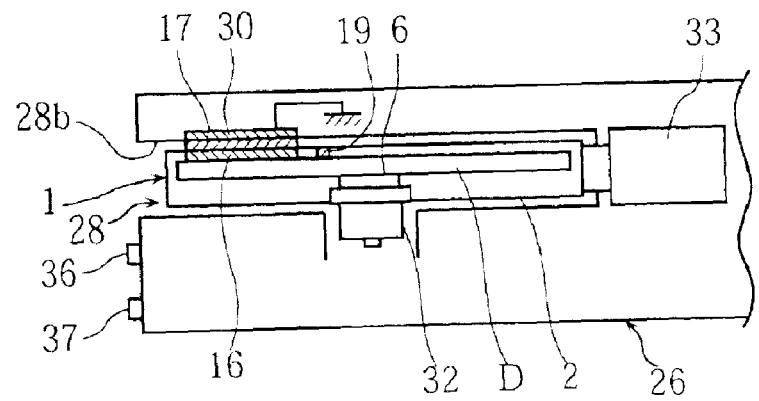
FIG. 19 illustrates an example of modified disk apparatus.

In the above-described embodiment, arrangements are made for enabling a laser beam to strike on the lower side of the storage disk D. The present invention, however, is not limited to this. As shown in FIG. 19, the ground terminal 30 may be provided in the upper wall surface 28b of the disk drive 28, and accordingly, the anti-static layer 16 and the cushion 19 may be provided on the upper case member 10. In this case, a laser beam strikes on the upper side of the storage disk D.

Further, according to the present invention, both the upper and the lower sides of the storage disk D may be provided with a recording layer. In this case, each of the upper and the lower case members 10, 11 may be provided with an anti-static layer 16 and a cushion 19.

According to the present invention, the casing 2 of the disk cartridge 1 may be made of a conductive material, instead of providing the anti-static layer 16. In this case, the static electricity elimination may be performed by causing the storage disk D to contact with the casing 2.

Further, the anti-static layer 16 may not necessarily be U-shaped. For instance, the anti-static layer 16 may be a linear short strip, covering only a small area of the disk-facing portion 15 (see FIG. 1 or 3A). Still further, in the above embodiment, the spindle motor 32 is vertically movable to approach or recede from the disk cartridge 1. Instead, the spindle motor 32 may be stationary, while the disk cartridge 1 may be replaceable relative to the spindle motor 32. According to the present invention, the disk drive 28 may be either a horizontal type (as shown in the accompanying drawings) or a vertical type in which the disk insertion slit of the disk drive extends vertically.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A disk cartridge comprising:
   a data storage disk including a recording portion and a non-recording portion;

a casing including an inner space for accommodating the disk, the casing including an inner surface facing the disk;

an anti-static layer provided on the inner surface of the casing for eliminating static electricity generated on the disk; and an elastic member provided on the inner surface of the casing for contact with the non-recording portion of the disk;

wherein the elastic member assumes a non-deformed state for keeping the disk away from the anti-static layer, the elastic member also assuming an elastically deformed state for allowing the disk to move into contact with the anti-static layer.

2. The disk cartridge according to claim 1, wherein the casing is formed with an opening communicating with the inner space, the anti-static layer being formed in a disk-facing region on the inner surface and avoiding the opening.

3. The disk cartridge according to claim 2, further comprising a shutter and a hub, the shutter being slidable on the casing between a close position and an open position for selectively closing the opening of the casing, the hub being attached to a center of the disk, the hub coming into contact with the shutter in the close position so that the disk is spaced from the anti-static layer.

4. The disk cartridge according to claim 3, wherein the hub is provided with a magnetic member.

5. The disk cartridge according to claim 1, further comprising a conductive member provided on an external surface of the casing, the conductive member being connected to the anti-static layer.

6. A disk apparatus for managing data with respect to a disk cartridge, the cartridge including a data storage disk including a recording portion and a non-recording portion, a hub attached to the disk, a casing for accommodating the disk, an anti-static layer for eliminating static electricity generated on the disk, and an elastic member provided on the casing for contact with the non-recording portion of the disk, the disk apparatus comprising:

a disk drive into which the disk cartridge is inserted;

a rotatable holder that is detachably fixed to the hub of the disk and rotates the disk;

an actuator that causes the holder and the casing to approach and recede from each other; and a controller that manages the holder and the actuator;

wherein the controller causes the actuator and the holder to move the disk between a non-discharge position and a discharge position, the elastic member assuming a non-deformed state for keeping the disk away from the anti-static layer in the non-discharge portion of the disk, the elastic member also assuming an elastically deformed state for allowing the disk to move into contact with the anti-static layer in the discharge position of the disk.

7. The disk apparatus according to claim 6, wherein the controller causes the actuator to move the holder to a rotatable position where the disk and the anti-static layer are spaced enough to allow the disk to rotate freely.

8. The disk apparatus according to claim 6, wherein the controller causes the actuator to move the holder to an eject position where the disk cartridge is ejectable from the disk drive.

9. The disk apparatus according to claim 6, wherein the disk drive is provided with a ground terminal held at a ground potential, the ground terminal coming into contact with a conductive member provided on the disk cartridge when the cartridge is inserted into the disk drive.

10. The disk apparatus according to claim 6, wherein the controller causes the holder to rotate through an angle so that all recording area of the disk is discharged.

11. The disk apparatus according to claim 6, wherein the elastic member is brought into contact with the disk when the disk is rotating at a rate lower than a predetermined threshold.

12. The disk apparatus according to claim 6, further comprising a discharge on/off switch for selectively causing the disk to contact with the anti-static layer.

13. The disk apparatus according to claim 6, wherein the controller causes the actuator to move the holder for bringing the disk into contact with the anti-static layer when the disk is inserted into the disk drive.

14. The disk apparatus according to claim 6, wherein the controller causes the actuator to move the holder for bringing the disk into contact with the anti-static layer when the disk is about to be ejected from the disk drive.

15. The disk apparatus according to claim 6, wherein the holder is disposed opposite to the anti-static layer with respect to the disk.

* * * * *